United States Patent
Arnold et al.

(10) Patent No.: US 12,221,982 B1
(45) Date of Patent: Feb. 11, 2025

(54) TURBOCHARGER HAVING COMPRESSOR WITH LIQUID-COOLED BACKPLATE

(71) Applicant: Garrett Transportation I Inc., Torrance, CA (US)

(72) Inventors: Philippe Arnold, Thaon-les-Vosges (FR); Nathaniel Bontemps, Thaon-les-Vosges (FR); Peter Davies, Thaon-les-Vosges (FR)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 18/366,675

(22) Filed: Aug. 8, 2023

(51) Int. Cl.
   *F04D 29/58* (2006.01)
   *F01D 25/12* (2006.01)
   *F02C 6/12* (2006.01)

(52) U.S. Cl.
   CPC ........... *F04D 29/584* (2013.01); *F01D 25/12* (2013.01); *F02C 6/12* (2013.01); *F05D 2220/40* (2013.01); *F05D 2260/213* (2013.01)

(58) Field of Classification Search
   CPC ........ F04D 29/584; F04D 17/12; F04D 17/14; F04D 17/105; F01D 25/12; F02C 6/12; F05D 2260/213; F05D 2220/40
   USPC .......................................................... 60/599
   See application file for complete search history.

(56) References Cited

U.S. PATENT DOCUMENTS

| | | | |
|---|---|---|---|
| 7,014,418 B1* | 3/2006 | Arnold | F01D 5/048 |
| | | | 415/206 |
| 7,352,077 B2* | 4/2008 | Shibui | F01D 15/10 |
| | | | 290/52 |
| 2006/0042247 A1* | 3/2006 | Haugen | F02M 26/23 |
| | | | 60/600 |
| 2017/0022887 A1* | 1/2017 | Oakes | F04D 17/12 |
| 2017/0022993 A1* | 1/2017 | Eckl | F01D 25/243 |
| 2020/0165965 A1* | 5/2020 | Hu | F02B 29/0462 |
| 2021/0079809 A1* | 3/2021 | Mohamed | F01D 25/24 |

OTHER PUBLICATIONS

Jain, S., Fageria, R., Mishra, S., Ahmad, A. et al., "A Study on the Application of Turbo Expansion in Light Duty Gasoline and Diesel Engines: A Review", SAE Technical Paper 2018-01-0051, 2018, doi:10.4271/2018-01-0051, Published Apr. 3, 2018.

* cited by examiner

*Primary Examiner* — Kenneth J Hansen
*Assistant Examiner* — Kelsey L Stanek
(74) *Attorney, Agent, or Firm* — BelayIP (57) ABSTRACT

A turbocharger for an internal combustion engine or fuel cell includes a compressor having a liquid-cooled backplate through which a liquid coolant is circulated. The backplate reduces compressor outlet temperature, thereby reducing the cooling load on the intercooler for the engine, and enabling a reduction in charge air temperature entering the engine air inlet manifold. The compressor can include a serial two-stage compressor, in which case the backplate serves as a divider between the two impellers. In another variation, a turboexpander is combined on the same shaft with a single-stage compressor having the liquid-cooled backplate. Pressurized air from the compressor drives the turbine wheel of the turboexpander, expanding and reducing the temperature of the air before being fed to the engine.

14 Claims, 9 Drawing Sheets

TURBOCHARGER HAVING COMPRESSOR WITH LIQUID-COOLED BACKPLATE

BACKGROUND OF THE INVENTION

This application relates generally to compressors such as used in turbochargers and E-turbochargers for providing pressurized air to internal combustion engines, fuel cells, and the like.

Exhaust gas-driven turbochargers employ a turbine to extract power from the stream of exhaust gas coming from an internal combustion engine and use that power to drive a compressor in order to boost the pressure of the charge air supplied to the cylinders. Turbochargers improve the efficiency of the engine by increasing the charge air density. All other things being equal, increase in charge air density by a given percentage translates into an increase in engine power by the same percentage. Of course, all other things generally are not equal in this process; in particular, the charge air pressure boost from the turbocharger is attended by an increase in charge air temperature as a result of the air compression process, which negates some of the benefit of increased charge air pressure.

The compression ratio of a spark-ignition (SI) engine (e.g., gasoline, hydrogen, alternative fuel engines) is limited by knocking. Reducing the charge air temperature tends to mitigate knocking in SI engines, and hence higher compression ratios can be achieved before knocking becomes an issue. Diesel engines tend to produce high levels of NOx as a result of the high combustion temperature that is an inherent aspect of the diesel cycle. Reducing the charge air temperature can be effective to reduce NOx emissions. It is therefore desirable to boost the charge air pressure while reducing the air manifold inlet temperature as much as possible to achieve greater gains in SI engine efficiency while preventing knocking, and to mitigate NOx emissions from diesel engines.

Charge air coolers (also called intercoolers) have commonly been employed in turbocharged engine systems for this purpose. An intercooler is a heat exchanger through which the charge air is passed prior to being fed to the air inlet manifold of the engine. Air-to-air intercoolers employ air as the cooling medium, while air-to-liquid intercoolers use a liquid such as water. There is a limit to how effectively the intercooler can reduce the charge air temperature, given the necessity of meeting other design constraints such as the space required for the intercooler in the engine compartment. In modern automobiles and trucks, the space in the engine compartment tends to be severely limited, making it impractical in many cases to improve intercooling effectiveness by simply providing a larger intercooler or multiple intercoolers in series.

SUMMARY OF THE DISCLOSURE

The present invention aims to provide improvements in turbocharged engine systems, enabling more-effective reduction of charge air temperature without compromising engine compartment space. In accordance with one embodiment of the invention, a turbocharger comprises:

- a compressor comprising a compressor wheel and a compressor housing, the compressor wheel being affixed to a shaft and being disposed in the compressor housing, the compressor wheel comprising a first impeller having a first back disk, the compressor housing defining a first air inlet for leading air into the first impeller, a first volute surrounding the first impeller and configured for receiving pressurized air from the first impeller, and a first diffuser leading from the first impeller into the first volute;
- the compressor housing including a backplate, the backplate having a first face opposing the first back disk, the backplate defining a coolant inlet, a coolant passage for circulating a liquid coolant through the backplate, and a coolant outlet; and
- an exhaust gas-driven turbine comprising a turbine wheel enclosed in a turbine housing, the turbine wheel being mounted on the shaft of the compressor wheel, the turbine housing defining a turbine volute for receiving exhaust gases from an internal combustion engine and feeding the exhaust gases into the turbine wheel.

The liquid-cooled backplate reduces the temperature of the pressurized air discharged into the first volute. Accordingly, the cooling load on the intercooler or charge air cooler for the engine is reduced, which improves the effectiveness of the intercooler, leading to reduced charge air temperature going into the engine. The reduction in compressor discharge temperature also reduces the required power input for the compressor to produce a given pressure increase, improving compressor efficiency. Significantly, these benefits can be achieved without substantially encroaching on engine compartment space.

In another embodiment, the compressor wheel further comprises a second impeller having a second back disk. The compressor housing defines a second air inlet for leading air into the second impeller, a second volute surrounding the second impeller and configured for receiving pressurized air from the second impeller, and a second diffuser leading from the second impeller into the second volute. The first impeller and the second impeller are arranged in a back-to-back configuration with the first back disk opposing the second back disk and the backplate located therebetween, the backplate having a second face opposing the second back disk.

The first face of the backplate can define one wall of the first diffuser and the second face of the backplate can define one wall of the second diffuser.

In a further embodiment, the turbocharger includes a turboexpander in place of a second impeller. The turboexpander comprises an air-driven turbine wheel mounted in a turboexpander housing, and a connecting conduit leading pressurized air from the first volute into the air-driven turbine wheel, the turboexpander expanding and reducing temperature of the pressurized air.

In an embodiment, the air-driven turbine wheel of the turboexpander is mounted on the shaft of the compressor wheel. Accordingly, the work done on the air-driven turbine wheel is added to the shaft, aiding the compression of the air.

The turbocharger can include a liquid-cooled heat exchanger disposed in heat-transfer communication with the turboexpander for further reducing the temperature of the air to be delivered to the engine.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
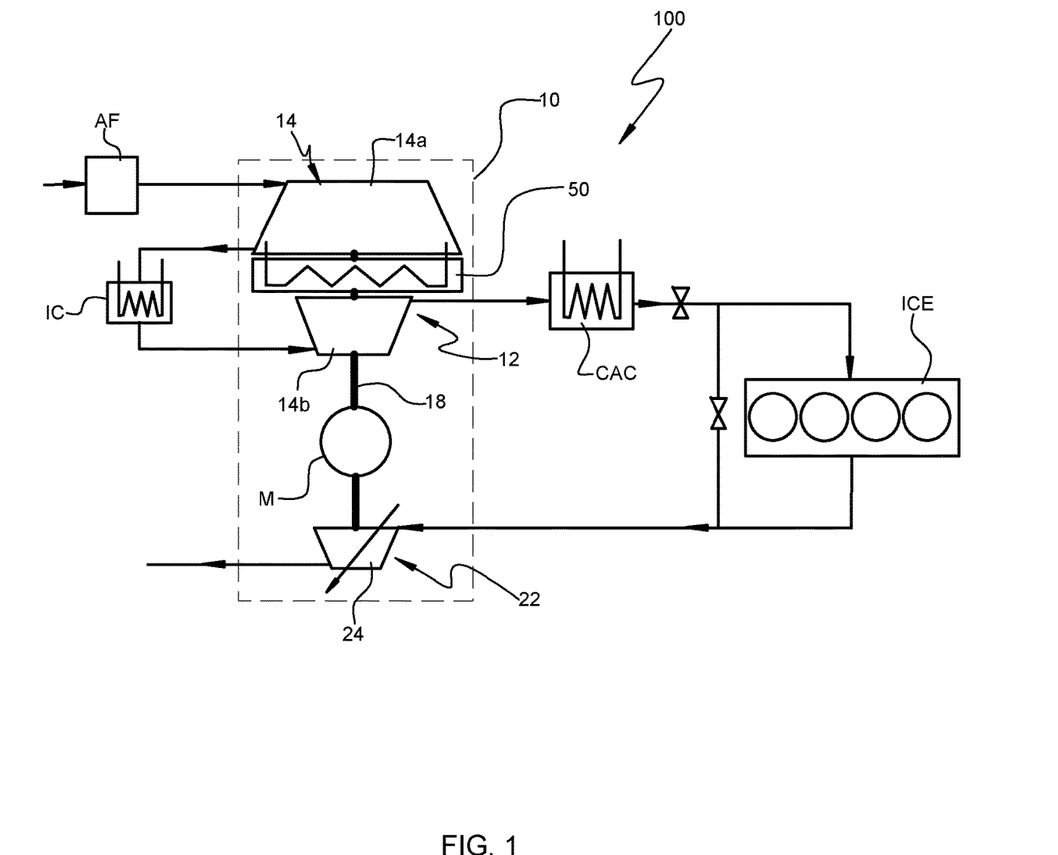
FIG. 1 is a schematic diagram of a turbocharged internal combustion engine system in accordance with a first embodiment of the invention.

FIG. 1 is a schematic illustration of an engine and turbocharger system 100 having features of the present invention in accordance with a first embodiment thereof. The system includes an internal combustion engine ICE and a turbocharger 10. The turbocharger comprises a compressor 12 and a turbine 22. The compressor includes a compressor wheel 14 mounted to a shaft 18. The compressor wheel is a twin-impeller type of wheel, having a first impeller 14a and a second impeller 14b. The two impellers are serially arranged; thus, air is drawn through an air filter AF into the first impeller 14a, which performs a first-stage compression process on the air. The air from the first impeller is led into the second impeller 14b, which performs a second-stage compression process to further raise the pressure of the air. As shown, an intercooler IC may be arranged, externally to the turbocharger itself, for the cooling of the air pressurized by the first impeller prior to the air being fed into the second impeller. Air is discharged from the second impeller and forwarded to the air intake of the engine ICE. The system can include a charge air cooler CAC for cooling the charge air before it is fed into the engine. A similar architecture to the system 100 can be used when the "customer" for the pressurized air is not an internal combustion engine but rather is a fuel cell or stack of fuel cells. Thus, the present invention is not limited to applications for internal combustion engines, but can include other applications such as fuel cells.

Exhaust gases from the engine are fed into the turbine 22. The turbine includes a turbine wheel 24 mounted on the same shaft 18 with the compressor wheel. The turbine expands the exhaust gases and thereby extracts power therefrom, which drives the compressor impellers to compressor the air for the engine.

The elements of the engine system 100 described thus far are generally conventional in internal combustion engine systems and fuel cells systems having a turbocharger or E-compressor. The intercooler IC and the charge air cooler CAC typically are air-to-air type heat exchangers in which the cooling medium is ambient air. These heat exchangers are external to the turbocharger and take up space within the engine compartment.

The aspect of the system 100 in FIG. 1 that is not conventional and is provided by the present invention is a liquid-cooled backplate 50 disposed between the first impeller 14a and the second impeller 14b. The liquid-cooled backplate is integral to the turbocharger, i.e., it is wholly contained within the outer envelope of the turbocharger. The backplate comprises an air-to-liquid heat exchanger in which the cooling medium is liquid such as water, which may include an additive such as ethylene glycol ("antifreeze") or the like. The function of the liquid-cooled backplate 50 within the turbocharger is to reduce the temperature of the air pressurized by the first impeller 14a and by the second impeller 14b, by virtue of the backplate being in heat-transfer communication with these two streams of pressurized air. Accordingly, the cooling load on the intercooler IC and the cooling load on the charge air cooler CAC are both reduced by the liquid-cooled backplate. These heat exchangers therefore can more-effectively cool the charge air supplied to the engine. Reduction in the air inlet temperature to the engine results in an increased density of the charge air, with all the attendant benefits as noted above (e.g., reduction of engine knocking in SI engines, reduction of NOx emissions in diesel engines).

Figure 6:
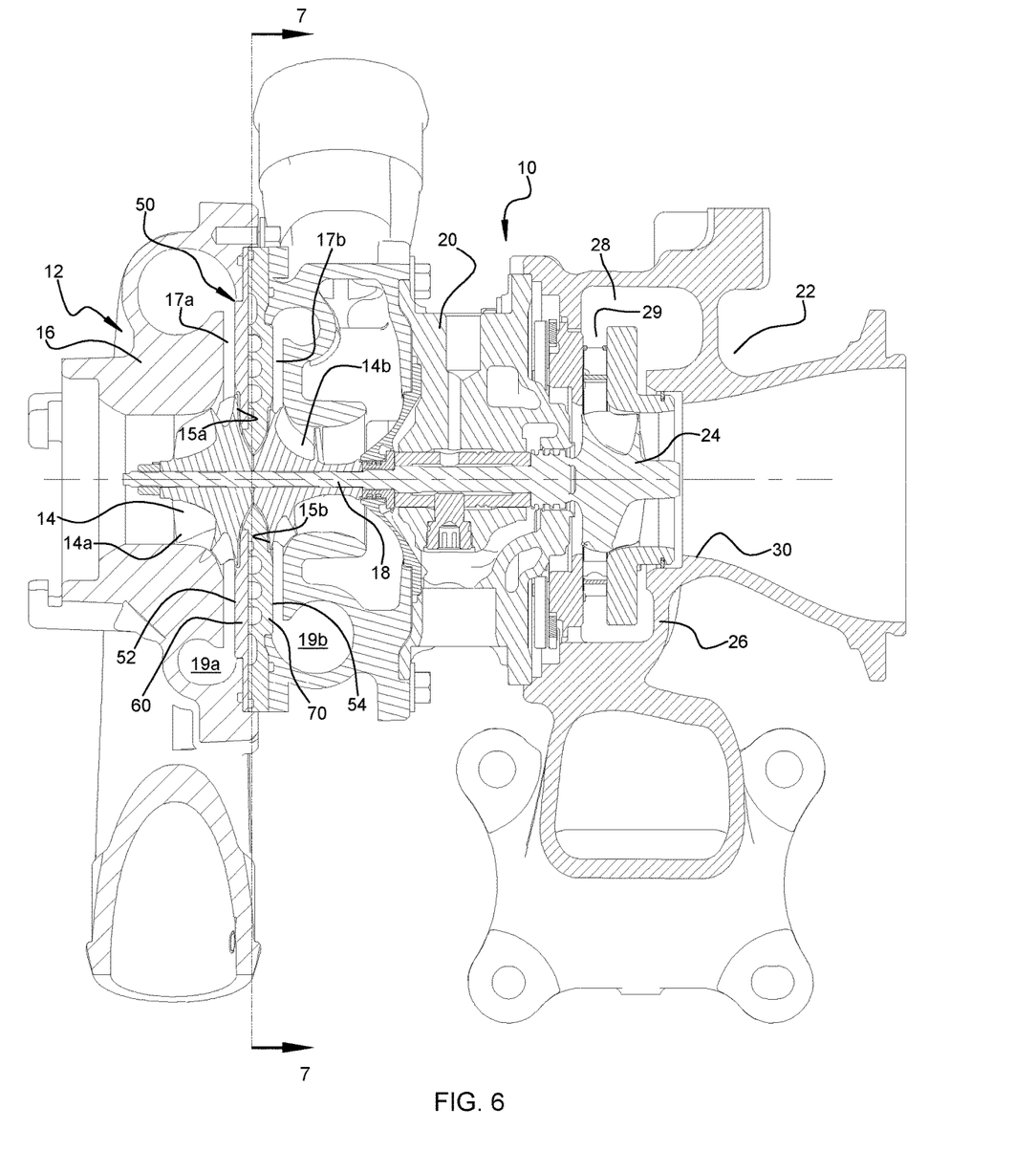
FIG. 6 a cross-sectional view along line 6-6 in FIG. 5.

With reference to FIG. 6, a detailed layout of a turbocharger in accordance with the first embodiment is shown. The compressor 12 includes a compressor housing 16 in which the compressor wheel 14 is mounted, being attached to a rotatable shaft 18 which is supported in bearings disposed in a center housing 20. The compressor housing leads ambient air into the compressor wheel 14, which comprises a first impeller 14a and a second impeller 14b. The first impeller 14a has a first back disk 15a, and the second impeller has a second back disk 15b. The two impellers are mounted to the shaft 18 in a back-to-back configuration, i.e., the first back disk 15a opposes the second back disk 15b, with an axial space therebetween, such that the two impellers face in opposite directions. The compressor housing 16 defines a first diffuser 17a that receives air pressurized by the first impeller 14a and leads the air radially outwardly, diffusing the air along the way, and delivers the air into a first volute 19a defined by the compressor housing. Similarly, for the second impeller 14b, the compressor housing defines a second diffuser 17b and a second volute 19b. A crossover duct (not visible in FIG. 6) leads air from the first volute 19a into an inlet to the second impeller, such that the two impellers act in series to perform a two-stage compression of air for delivery to the engine.

The turbine 22 comprises a turbine wheel 24 mounted on the shaft 18 and disposed within a turbine housing 26 and 30. The turbine housing defines an annular volute or chamber 28 that receives exhaust gases from the engine. The exhaust gases are fed radially inwardly through a turbine nozzle 29 into the turbine wheel 24, which extracts power from the exhaust gas stream to drive the compressor.

The liquid-cooled backplate 50 is disposed within the turbocharger, located between the two impellers 14a and 14b, and axially clamped between the main compressor housing 16 and the center housing 20. The backplate 50 has a first face 52 that forms one wall of the first diffuser 17a, and an opposite second face 54 that forms one wall of the second diffuser 17b. The backplate comprises a first plate 60 of annular configuration and a second plate 70 of annular configuration forming a sandwich construction. A coolant passage 80 for a flow of a liquid coolant is defined within the backplate. In the illustrated embodiment, the coolant passage 80 is defined as a meandering groove in the second plate 70, and the first plate 60 closes the open side of the groove to form a closed passage.

Figure 7:
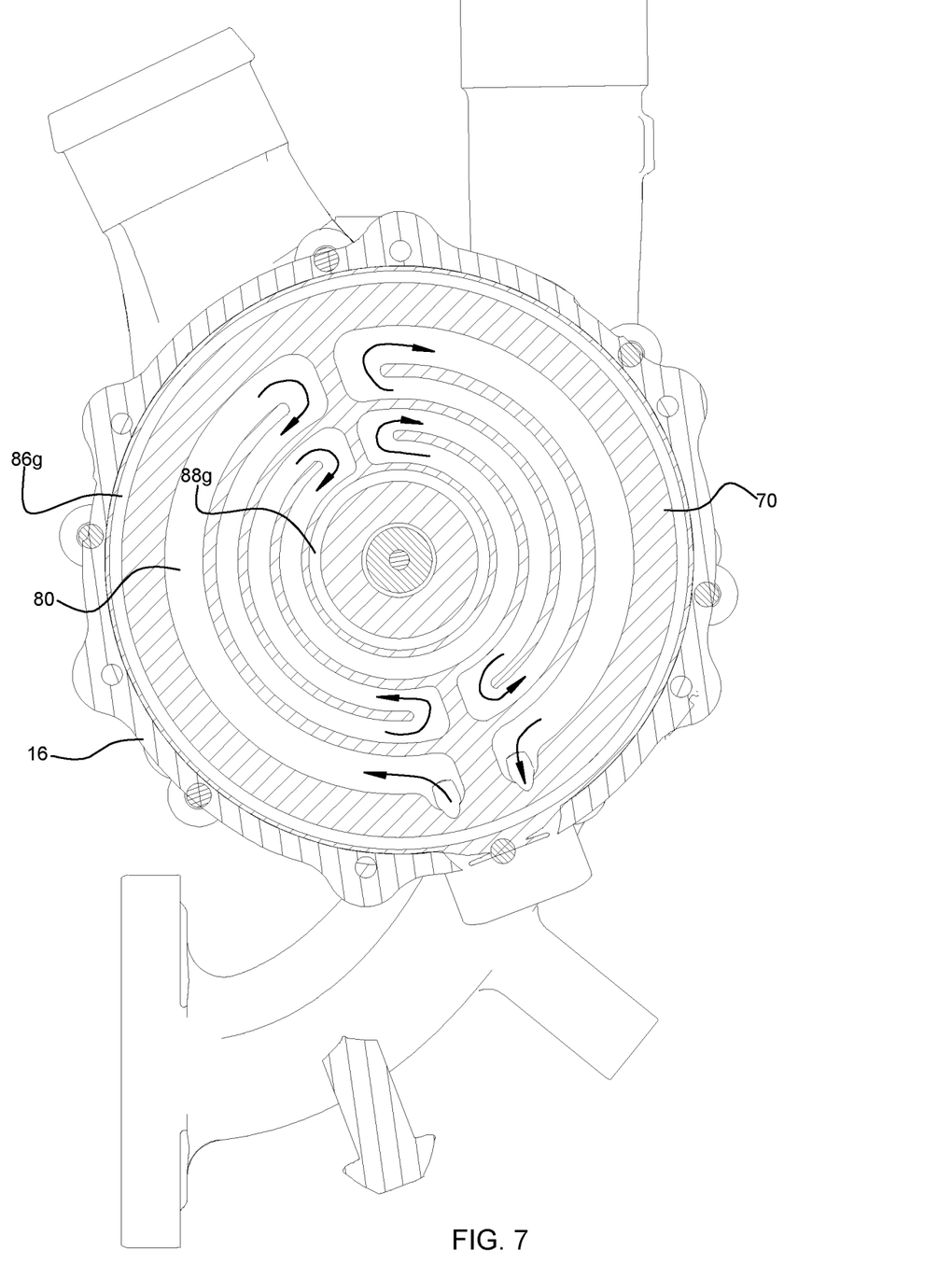
FIG. 7 is a cross-sectional view along line 7-7 in FIG. 6.
Figure 8:
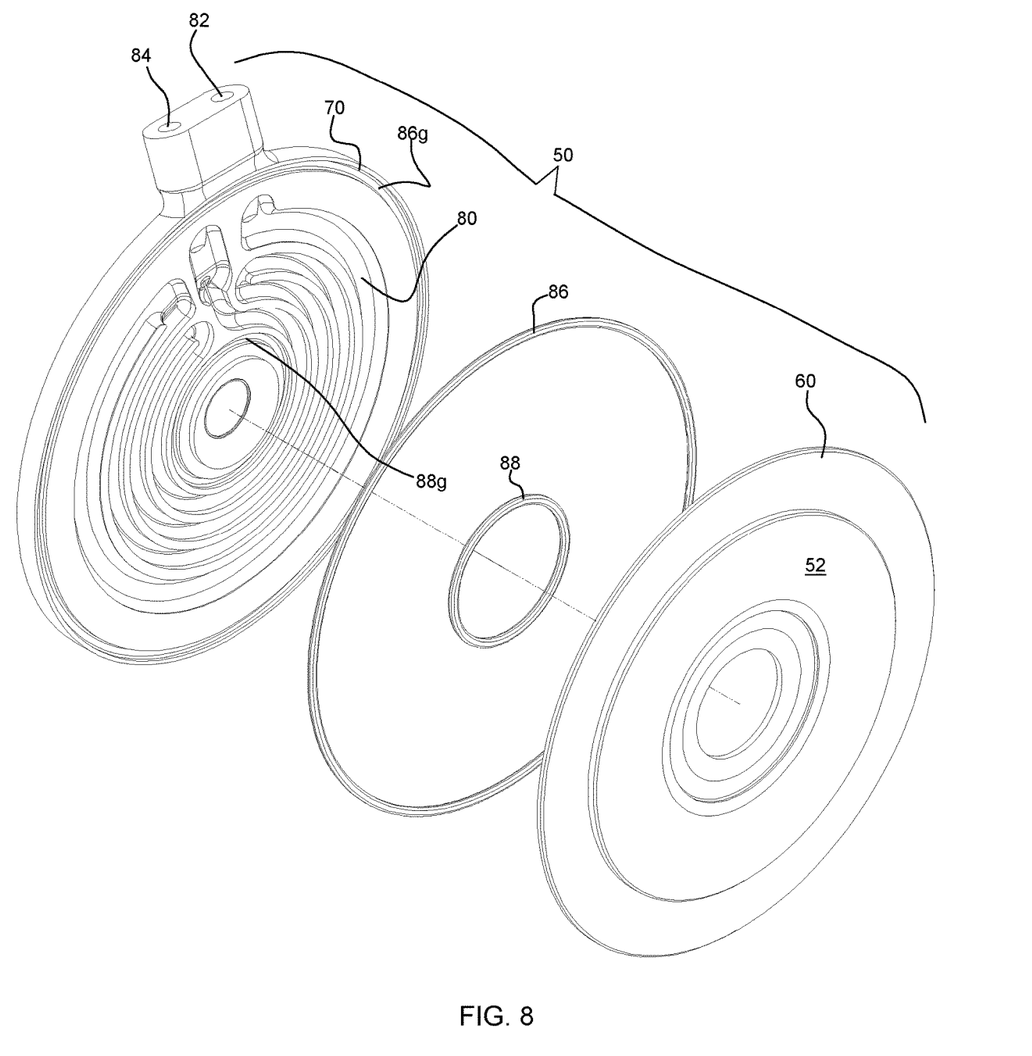
FIG. 8 is an exploded view of a liquid-cooled backplate in accordance with an embodiment of the invention.
Figure 9:
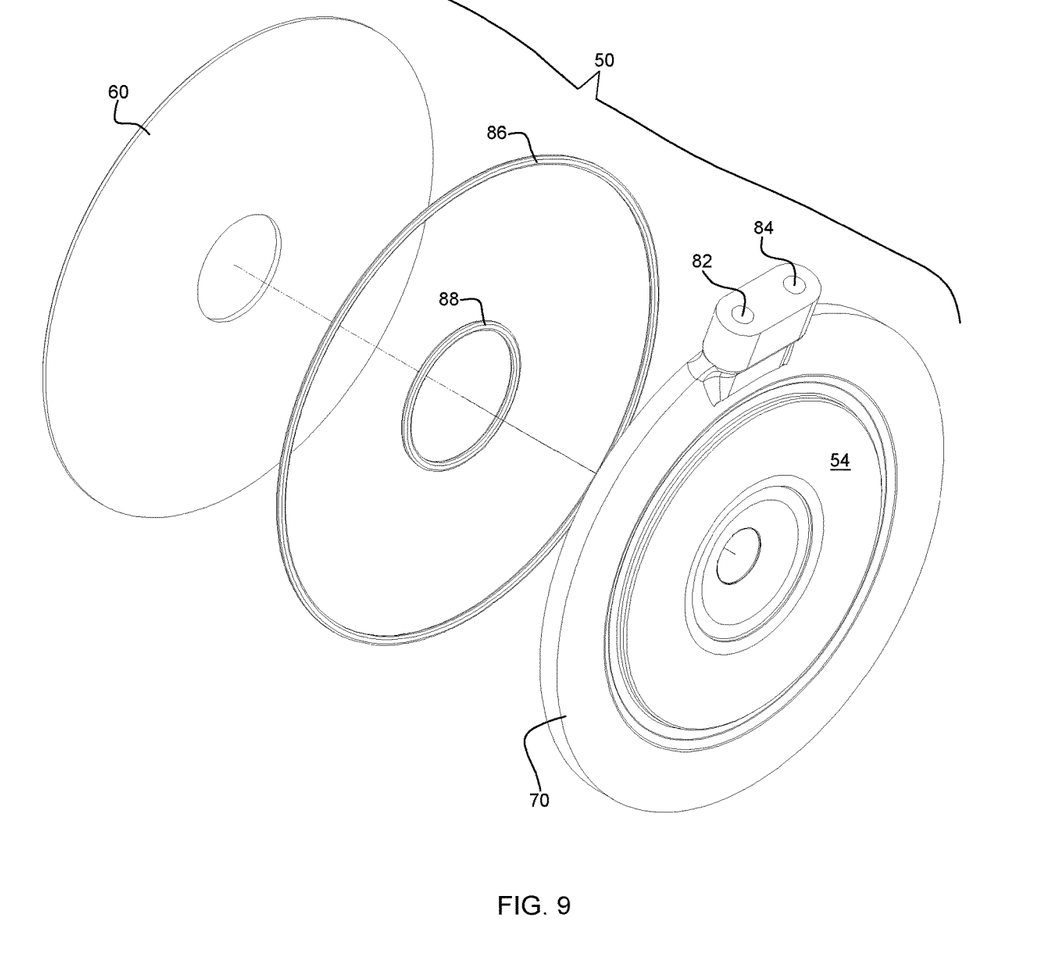
FIG. 9 is an exploded view of the liquid-cooled backplate viewed from another direction.

With reference to FIGS. 7-9, the second plate 70 defines a coolant inlet 82 leading into the groove 80, and a coolant outlet 84 leading out from the groove. A pair of seal rings 86 and 88 are retained within respective seal ring grooves 86g and 88g defined in the second plate 70, the seal rings abutting the opposing first plate 60 to prevent leakage of liquid coolant.

Figure 2:
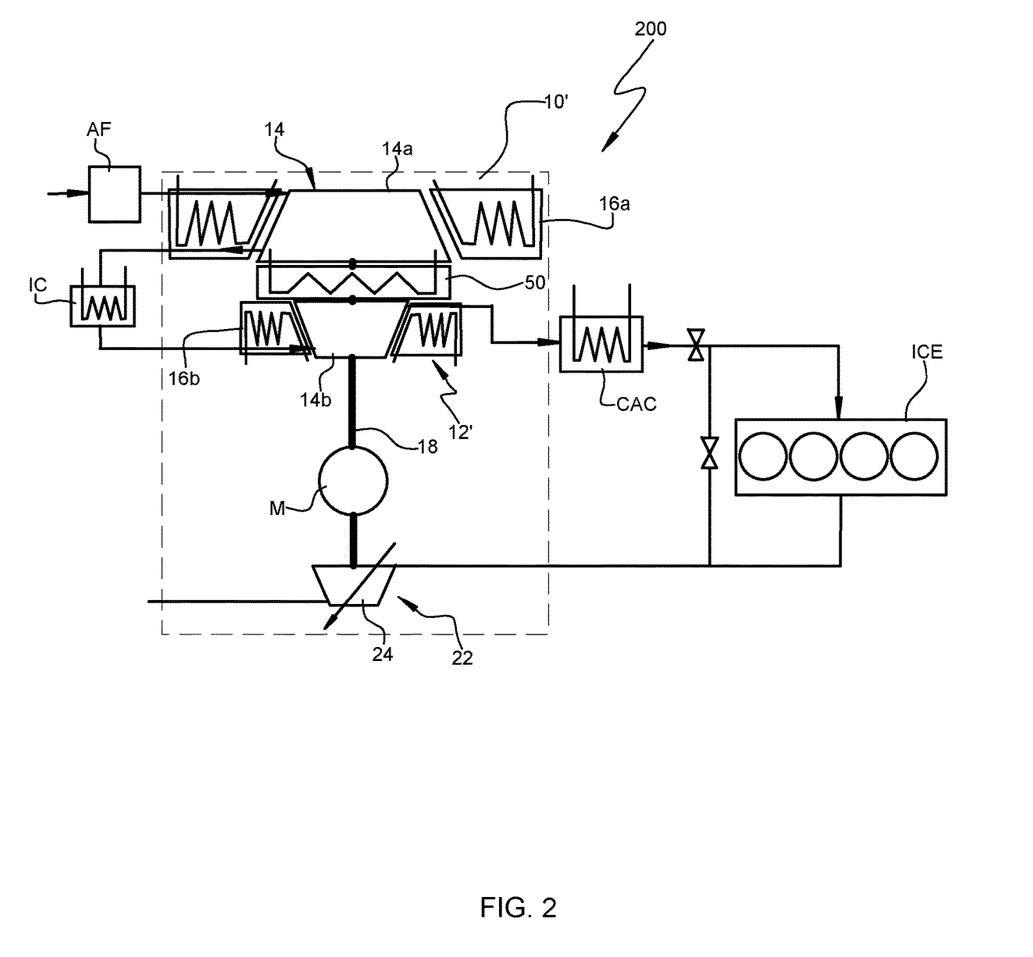
FIG. 2 is a schematic diagram of a turbocharged internal combustion engine system in accordance with a second embodiment of the invention.

The invention is susceptible to various embodiments. A second embodiment of a turbocharged engine system 200 is shown in FIG. 2. The system of the second embodiment is generally similar to that of the first embodiment, and a description of similar features will not be repeated. The distinguishing features of the system 200 lie in the turbocharger 10', specifically its compressor 12', and comprise a liquid-cooled low-pressure (LP) compressor housing 16a and/or a liquid-cooled high-pressure (HP) compressor housing 16b, in addition to the liquid-cooled backplate 50. The LP compressor housing 16a houses the first impeller 14a (and hence defines such features as the shroud that lies closely adjacent to the outer tips of the first impeller blades, as well as a wall of the first diffuser as a continuation of the shroud). Similarly, the HP compressor housing 16b houses the second impeller 14b (and defines the shroud for the second impeller and a wall of the second diffuser). Either or both of the LP and HP compressor housings can define one or more coolant passages for the circulation of a liquid coolant through the housing.

Figure 3:
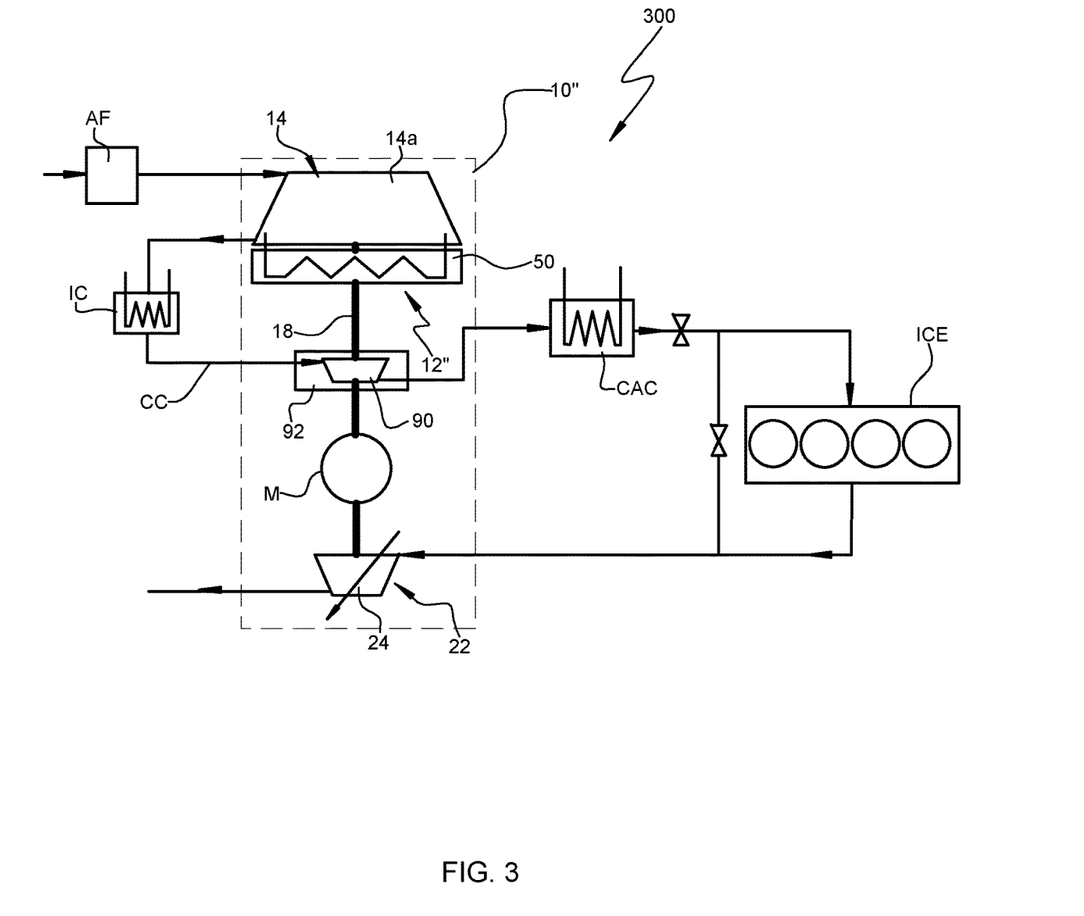
FIG. 3 is a schematic diagram of a turbocharged internal combustion engine system in accordance with a third embodiment of the invention.

FIG. 3 illustrates a third embodiment of the invention. The turbocharged engine system 300 of the third embodiment includes a turbocharger 10" having a single-stage compressor 12" comprising a single impeller 14a. On the same shaft 18 as the compressor wheel 14, an air-driven turbine wheel 90 of a turboexpander is mounted. The air-driven turbine wheel is contained within a turbine housing 92, which may, for example, be disposed between the compressor housing and the center housing of the turbocharger. Pressurized air from the compressor 12 is fed via a connecting conduit CC into the turboexpander 90, which expands the air, thereby extracting work from the air and reducing the pressure and temperature of the air before the air is supplied to the engine. Thus, charge air temperature is reduced, providing the aforementioned benefits. Additionally, the work extracted by the turboexpander is added to the compressor shaft, aiding in the air compression process.

Figure 4:
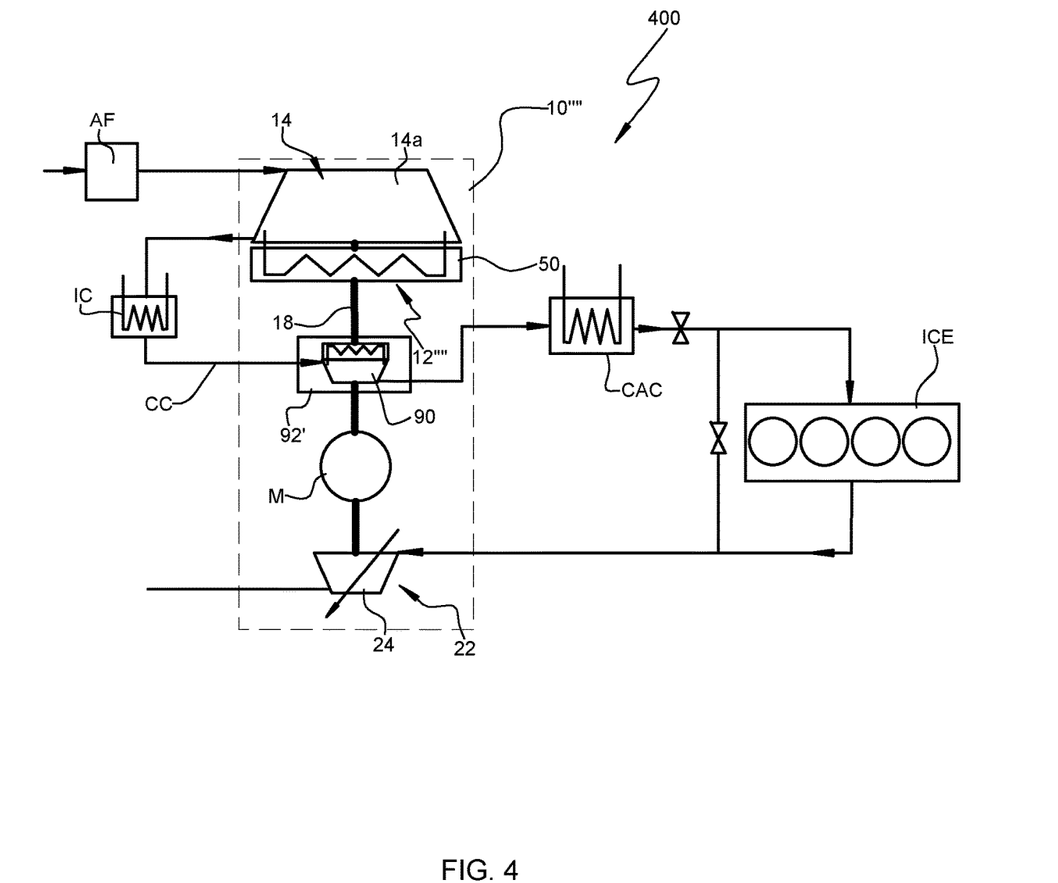
FIG. 4 is a schematic diagram of a turbocharged internal combustion engine system in accordance with a fourth embodiment of the invention.
Figure 5:
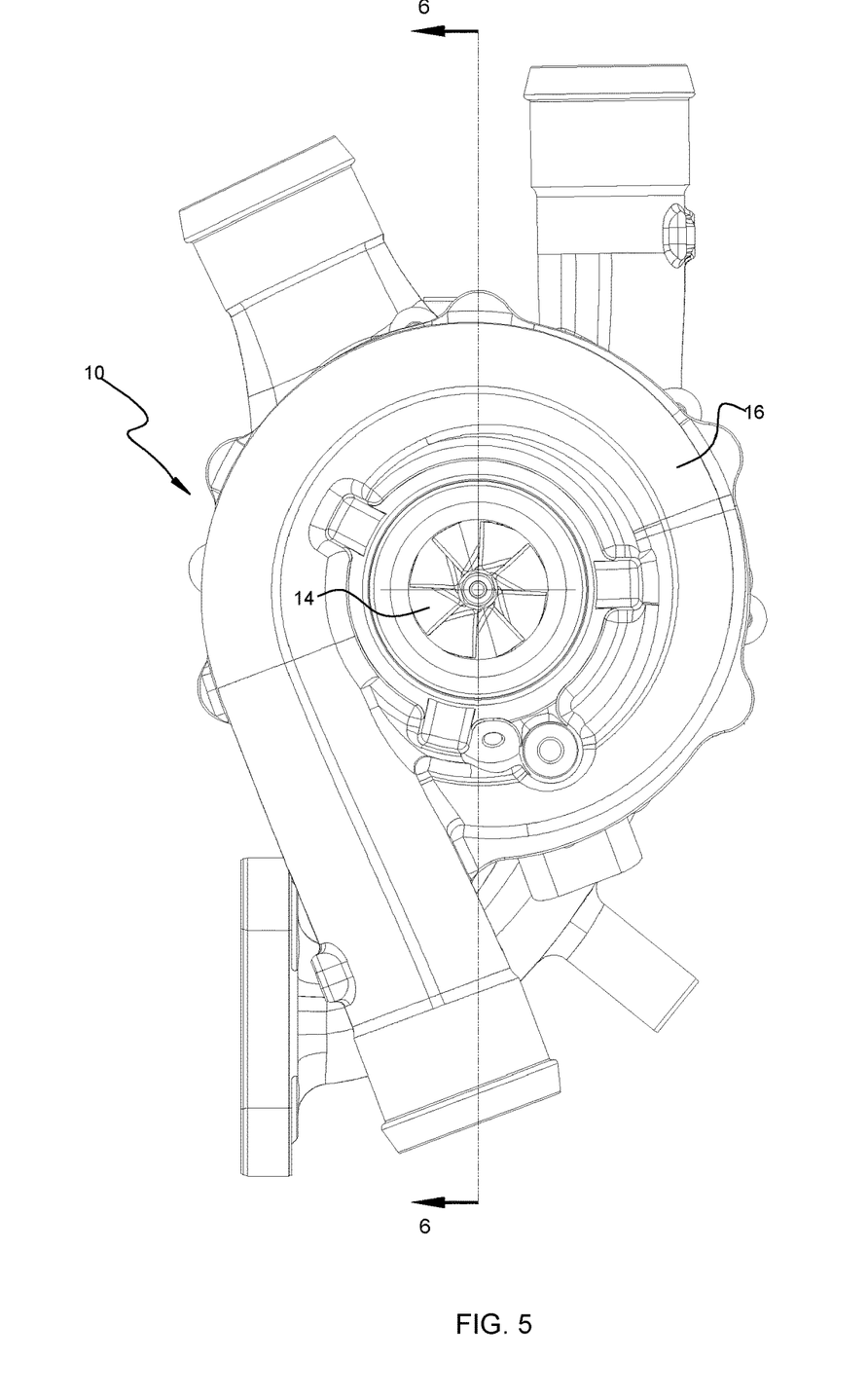
FIG. 5 is an end view of a turbocharger in accordance with an embodiment of the invention.

A fourth embodiment of the invention is shown in FIG. 4. The turbocharged engine system 400 has a turbocharger 10"" generally similar to that of the third embodiment, except that the turboexpander has a liquid-cooled housing 92', which further reduces the charge air temperature seen by the engine.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims. Other variations that do not depart from the described inventive concept are also included within the scope of the appended claims.

What is claimed is:

1. A compressor for a turbocharger, comprising:
    a compressor wheel and a compressor housing;
    a compressor wheel being affixed to a shaft and being disposed in the compressor housing, the compressor wheel comprising a first impeller having a first back disk, the compressor housing defining a first air inlet for leading air into the first impeller, a first volute surrounding the first impeller and configured for receiving pressurized air from the first impeller, and a first diffuser leading from the first impeller into the first volute;
    the compressor housing including a backplate, the backplate having a first face opposing the first back disk, the backplate defining a coolant inlet, a coolant passage for circulating a liquid coolant through the backplate, and a coolant outlet;
    a turboexpander comprising an air-driven turbine wheel mounted in a turbine housing, and a connecting conduit leading pressurized air from the first volute into the air-driven turbine wheel, the turboexpander expanding and cooling the pressurized air; and
    a liquid-cooled heat exchanger disposed in heat-transfer communication with the turboexpander.

2. The compressor of claim 1, wherein the first face of the backplate defines one wall of the first diffuser.

3. The compressor of claim 1, the compressor wheel further comprising a second impeller having a second back disk, the compressor housing defining a second air inlet for leading air into the second impeller, a second volute surrounding the second impeller and configured for receiving pressurized air from the second impeller, and a second diffuser leading from the second impeller into the second volute, the first impeller and the second impeller being arranged in a back-to-back configuration with the first back disk opposing the second back disk and the backplate located therebetween, the backplate having a second face opposing the second back disk.

4. The compressor of claim 3, wherein the first face of the backplate defines one wall of the first diffuser and the second face of the backplate defines one wall of the second diffuser.

5. The compressor of claim 4, wherein the compressor housing comprises a low-pressure compressor housing for the first impeller and a high-pressure compressor housing for the second impeller, and wherein at least one of the low-pressure compressor housing and the high-pressure compressor housing is a liquid-cooled housing.

6. The compressor of claim 1, wherein the air-driven turbine wheel is mounted on the shaft of the compressor wheel.

7. The compressor of claim 1, further comprising an electric motor mounted on the shaft.

8. A turbocharger, comprising:
    a compressor comprising a compressor wheel and a compressor housing, the compressor wheel being affixed to a shaft and being disposed in the compressor housing, the compressor wheel comprising a first impeller having a first back disk, the compressor housing defining a first air inlet for leading air into the first impeller, a first volute surrounding the first impeller and configured for receiving pressurized air from the first impeller, and a first diffuser leading from the first impeller into the first volute;
    the compressor housing including a backplate, the backplate having a first face opposing the first back disk, the backplate defining a coolant inlet, a coolant passage for circulating a liquid coolant through the backplate, and a coolant outlet; and
    an exhaust gas-driven turbine comprising a turbine wheel enclosed in a turbine housing, the turbine wheel being mounted on the shaft of the compressor wheel, the turbine housing defining a turbine volute for receiving exhaust gases from an internal combustion engine and feeding the exhaust gases into the turbine wheel; and a turboexpander comprising an air-driven turbine wheel mounted in a turboexpander housing, and a connecting conduit leading pressurized air from the first volute into the air-driven turbine wheel, the turboexpander expanding and reducing temperature of the pressurized air.

9. The turbocharger of claim 8, wherein the first face of the backplate defines one wall of the first diffuser.

10. The turbocharger of claim 8, the compressor wheel further comprising a second impeller having a second back disk, the compressor housing defining a second air inlet for leading air into the second impeller, a second volute surrounding the second impeller and configured for receiving pressurized air from the second impeller, and a second diffuser leading from the second impeller into the second volute, the first impeller and the second impeller being arranged in a back-to-back configuration with the first back disk opposing the second back disk and the backplate located therebetween, the backplate having a second face opposing the second back disk.

11. The turbocharger of claim 10, wherein the first face of the backplate defines one wall of the first diffuser and the second face of the backplate defines one wall of the second diffuser.

12. The turbocharger of claim 11, wherein the compressor housing comprises a low-pressure compressor housing for the first impeller and a high-pressure compressor housing for the second impeller, and wherein at least one of the low-pressure compressor housing and the high-pressure compressor housing is a liquid-cooled housing.

13. The turbocharger of claim 8, wherein the air-driven turbine wheel of the turboexpander is mounted on the shaft of the compressor wheel.

14. The turbocharger of claim 8, further comprising a liquid-cooled heat exchanger disposed in heat-transfer communication with the turboexpander.

* * * * *